US008953468B2

(12) United States Patent
Sloyer et al.

(10) Patent No.: US 8,953,468 B2
(45) Date of Patent: Feb. 10, 2015

(54) VOICE OVER INTERNET PROTOCOL (VOIP) SESSION QUALITY

(75) Inventors: Jeffrey B. Sloyer, Fishersville, VA (US); Chelsea Christine Beerse, Fairport, NY (US); Arno Denne, Coolock (IE); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 13/114,666

(22) Filed: May 24, 2011

(65) Prior Publication Data
US 2012/0300646 A1 Nov. 29, 2012

(51) Int. Cl.
| | |
|---|---|
| H04L 12/18 | (2006.01) |
| H04L 12/66 | (2006.01) |
| H04L 29/06 | (2006.01) |
| H04L 12/58 | (2006.01) |
| H04M 7/00 | (2006.01) |

(52) U.S. Cl.
CPC ............ *H04L 12/1827* (2013.01); *H04L 12/66* (2013.01); *H04L 65/80* (2013.01); *H04L 65/403* (2013.01); *H04L 65/1086* (2013.01); *H04L 12/1868* (2013.01); *H04L 51/26* (2013.01); *H04M 7/006* (2013.01)
USPC ........................................................ 370/252

(58) Field of Classification Search
None
See application file for complete search history.

(56) References Cited

U.S. PATENT DOCUMENTS

| | | |
|---|---|---|
| 6,914,900 B1 | 7/2005 | Komatsu et al. |
| 7,388,946 B1 | 6/2008 | Mussman et al. |
| 7,706,291 B2 | 4/2010 | Luft et al. |
| 7,738,643 B1 | 6/2010 | Garrison et al. |
| 7,974,212 B2 | 7/2011 | Leung et al. |
| 2003/0039216 A1 | 2/2003 | Sheldon et al. |
| 2004/0064760 A1 | 4/2004 | Hicks et al. |
| 2004/0179515 A1* | 9/2004 | Kamani et al. ................. 370/352 |
| 2006/0098625 A1 | 5/2006 | King et al. |
| 2006/0109786 A1* | 5/2006 | Abdel-Kader et al. ....... 370/232 |
| 2006/0153174 A1 | 7/2006 | Towns-von Stauber et al. |
| 2006/0198360 A1 | 9/2006 | Biage et al. |

(Continued)

OTHER PUBLICATIONS

IBM, Teleconferencing Functionality for Moderator Control of Noisy Lines, IPCOM000184416D, IP.com, Jun. 23, 2009, IBM.

(Continued)

*Primary Examiner* — Huy D Vu
*Assistant Examiner* — Bao G Nguyen
(74) *Attorney, Agent, or Firm* — Holland & Knight LLP; Brian J. Colandreo, Esq.; Jeffrey T. Placker, Esq.

(57) ABSTRACT

A method, computer program product, and system for VoIP session quality is described. A method may comprise allowing a user to define a session quality threshold for a Voice-over-Internet-Protocol (VoIP) session of a VoIP conference, the session quality threshold corresponding to a session quality characteristic of the VoIP session. The method may further comprise determining a session quality value for the session quality characteristic of the VoIP session. The method may additionally comprise determining if the session quality value for the session quality characteristic of the VoIP session is unacceptable based upon, at least in part, the session quality threshold that corresponds to the session quality characteristic of the VoIP session. The method may also comprise, in response to determining that the session quality value is unacceptable, initiating one or more predefined session quality actions.

16 Claims, 5 Drawing Sheets

(56) References Cited

U.S. PATENT DOCUMENTS

| | | |
|---|---|---|
| 2007/0008899 A1 | 1/2007 | Shim et al. |
| 2007/0019618 A1 | 1/2007 | Shaffer et al. |
| 2007/0097876 A1 | 5/2007 | Maes |
| 2008/0062997 A1 | 3/2008 | Nix |
| 2008/0063149 A1 | 3/2008 | West et al. |
| 2009/0097475 A1* | 4/2009 | Seon .......................... 370/352 |
| 2009/0237240 A1 | 9/2009 | Leung et al. |
| 2009/0248411 A1* | 10/2009 | Konchitsky et al. .......... 704/242 |
| 2009/0316870 A1 | 12/2009 | Wise et al. |
| 2010/0269044 A1 | 10/2010 | Ivanyi et al. |
| 2011/0096762 A1 | 4/2011 | Basart |
| 2011/0103377 A1* | 5/2011 | Hua et al. ...................... 370/352 |

OTHER PUBLICATIONS

VoIP Performance Monitoring, Product Information, STI layerX Inc., http://www.webcitation.org/5vKeB7xHh, 2010, p. 1.

International Search Report Dated Oct. 25, 2012, received in International Application No. PCT/CA2012/050290, pp. 1-3.

* cited by examiner

VOICE OVER INTERNET PROTOCOL (VOIP) SESSION QUALITY

BACKGROUND OF THE INVENTION

Meetings and/or conferences may be conducted using unified telephony applications or Voice over Internet Protocol (VoIP) conferencing applications and/or systems. These meetings and/or conferences may include a moderator and one or more participants. There may be various noise during the conference such as echo and background noise which may be disruptive and/or distracting to the moderator and/or the one or more participants.

BRIEF SUMMARY OF THE INVENTION

In a first embodiment, a method may include allowing, via one or more computing devices, a user to define a session quality threshold for a Voice-over-Internet-Protocol (VoIP) session of a VoIP conference, the session quality threshold corresponding to a session quality characteristic of the VoIP session. The method may further include determining, via the one or more computing devices, a session quality value for the session quality characteristic of the VoIP session. The method may also determining, via the one or more computing devices, if the session quality value for the session quality characteristic of the VoIP session is unacceptable based upon, at least in part, the session quality threshold that corresponds to the session quality characteristic of the VoIP session. The method may additionally include, in response to determining that the session quality value is unacceptable, initiating, via the one or more computing devices, one or more predefined session quality actions.

One or more of the following features may be included. The method may include periodically determining the session quality value for the session quality characteristic of the VoIP session based upon, at least in part, a predefined time period. Moreover, the one or more predefined session quality actions may include indicating the session quality value in a graphical user interface available to one or more participants of the VoIP conference. The one or more predefined session quality actions may further include at least one of: establishing a new VoIP session for a client associated with the VoIP session having the unacceptable session quality value, and terminating the VoIP session having the unacceptable session quality value. The one or more predefined session quality actions may also include monitoring the session quality value for the VoIP session for a predefined time frame to determine if the session quality value is acceptable after the predefined time frame. The one or more predefined session quality actions may additionally include switching a client codec of the VoIP session to a new client codec that requires less bandwidth.

In an implementation, the one or more predefined session quality actions may include retransmitting one or more packets of a communication over the VoIP session, the one or more packets corresponding to one or more previously transmitted packets of the communication that were lost over the VoIP session, and transmitting the communication to one or more clients of the VoIP conference with the retransmitted packets of the communication. The one or more predefined session quality actions may further include eliminating background noise from a communication over the VoIP session before the communication is transmitted to one or more clients of the VoIP conference. The session quality characteristic may be based upon, at least in part, one or more of: echo, noise, background noise, foreground noise, stochastic noise, consistent noise, jitter, impedance, attenuation, interference, high pitch, low pitch, crackling, packet loss, bandwidth, voice drop, and amplitude drop.

In a second embodiment, a computer program product may reside on a computer readable storage medium and may have a plurality of instructions stored on it. When executed by a processor, the instructions may cause the processor to perform operations including allowing a user to define a session quality threshold for a Voice-over-Internet-Protocol (VoIP) session of a VoIP conference, the session quality threshold corresponding to a session quality characteristic of the VoIP session. The operations may further include determining a session quality value for the session quality characteristic of the VoIP session. The operations may also include determining if the session quality value for the session quality characteristic of the VoIP session is unacceptable based upon, at least in part, the session quality threshold that corresponds to the session quality characteristic of the VoIP session. The operations may additionally include, in response to determining that the session quality value is unacceptable, initiating one or more predefined session quality actions.

One or more of the following features may be included. The operations may include periodically determining the session quality value for the session quality characteristic of the VoIP session based upon, at least in part, a predefined time period. Moreover, the one or more predefined session quality actions may include indicating the session quality value in a graphical user interface available to one or more participants of the VoIP conference. The one or more predefined session quality actions may further include at least one of: establishing a new VoIP session for a client associated with the VoIP session having the unacceptable session quality value, and terminating the VoIP session having the unacceptable session quality value. The one or more predefined session quality actions may also include monitoring the session quality value for the VoIP session for a predefined time frame to determine if the session quality value is acceptable after the predefined time frame. The one or more predefined session quality actions may additionally include switching a client codec of the VoIP session to a new client codec that requires less bandwidth.

In an implementation, the one or more predefined session quality actions may include retransmitting one or more packets of a communication over the VoIP session, the one or more packets corresponding to one or more previously transmitted packets of the communication that were lost over the VoIP session, and transmitting the communication to one or more clients of the VoIP conference with the retransmitted packets of the communication. The one or more predefined session quality actions may further include eliminating background noise from a communication over the VoIP session before the communication is transmitted to one or more clients of the VoIP conference. The session quality characteristic may be based upon, at least in part, one or more of: echo, noise, background noise, foreground noise, stochastic noise, consistent noise, jitter, impedance, attenuation, interference, high pitch, low pitch, crackling, packet loss, bandwidth, voice drop, and amplitude drop.

In a third embodiment, a computing system is provided. The computing system may include at least one processor and at least one memory architecture coupled with the at least one processor. The computing system may also include a first software module executable by the at least one processor and the at least one memory architecture, wherein the first software module may be configured to allow a user to define a session quality threshold for a Voice-over-Internet-Protocol (VoIP) session of a VoIP conference, the session quality threshold corresponding to a session quality characteristic of the VoIP session. Further, the computing system may include a second software module which may be configured to determine a session quality value for the session quality characteristic of the VoIP session. Additionally, the computing system may include a third software module which may be configured to determine if the session quality value for the session quality characteristic of the VoIP session is unacceptable based upon, at least in part, the session quality threshold that corresponds to the session quality characteristic of the VoIP session. Moreover, the computing system may include a fourth software module which may be configured to, in response to determining that the session quality value is unacceptable, initiate one or more predefined session quality actions.

One or more of the following features may be included. The computing system may include a fifth software module which may be configured to periodically determining the session quality value for the session quality characteristic of the VoIP session based upon, at least in part, a predefined time period. Moreover, the one or more predefined session quality actions may include indicating the session quality value in a graphical user interface available to one or more participants of the VoIP conference. The one or more predefined session quality actions may further include at least one of: establishing a new VoIP session for a client associated with the VoIP session having the unacceptable session quality value, and terminating the VoIP session having the unacceptable session quality value. The one or more predefined session quality actions may also include monitoring the session quality value for the VoIP session for a predefined time frame to determine if the session quality value is acceptable after the predefined time frame. The one or more predefined session quality actions may additionally include switching a client codec of the VoIP session to a new client codec that requires less bandwidth.

In an implementation, the one or more predefined session quality actions may include retransmitting one or more packets of a communication over the VoIP session, the one or more packets corresponding to one or more previously transmitted packets of the communication that were lost over the VoIP session, and transmitting the communication to one or more clients of the VoIP conference with the retransmitted packets of the communication. The one or more predefined session quality actions may further include eliminating background noise from a communication over the VoIP session before the communication is transmitted to one or more clients of the VoIP conference. The session quality characteristic may be based upon, at least in part, one or more of: echo, noise, background noise, foreground noise, stochastic noise, consistent noise, jitter, impedance, attenuation, interference, high pitch, low pitch, crackling, packet loss, bandwidth, voice drop, and amplitude drop.

The details of one or more implementations are set forth in the accompanying drawings and the description below. Other features and advantages will become apparent from the description, the drawings, and the claims.

DETAILED DESCRIPTION OF THE INVENTION

Figure 1:
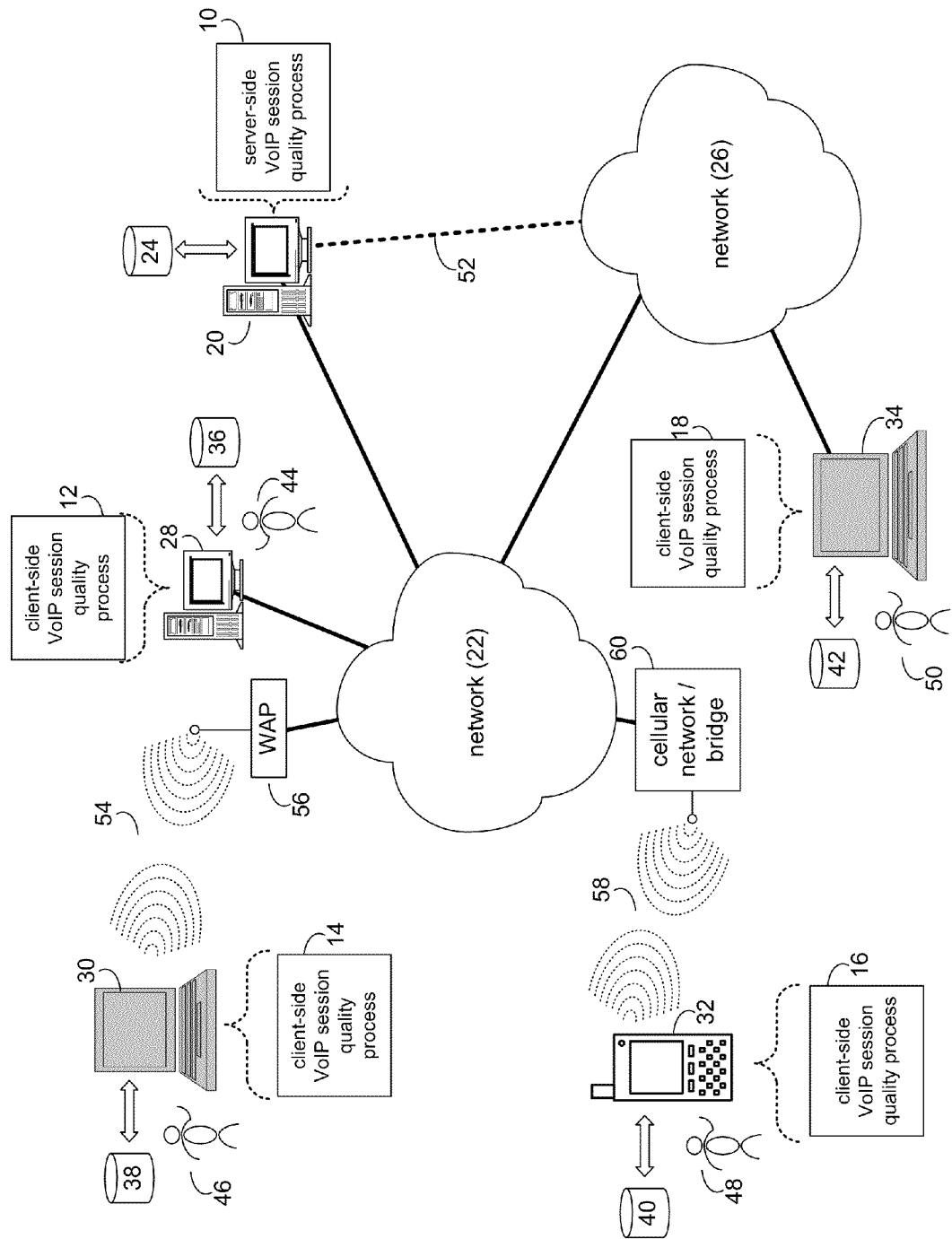
FIG. 1 is a diagrammatic view of a VoIP session quality process coupled to a distributed computing network.
Figure 2:
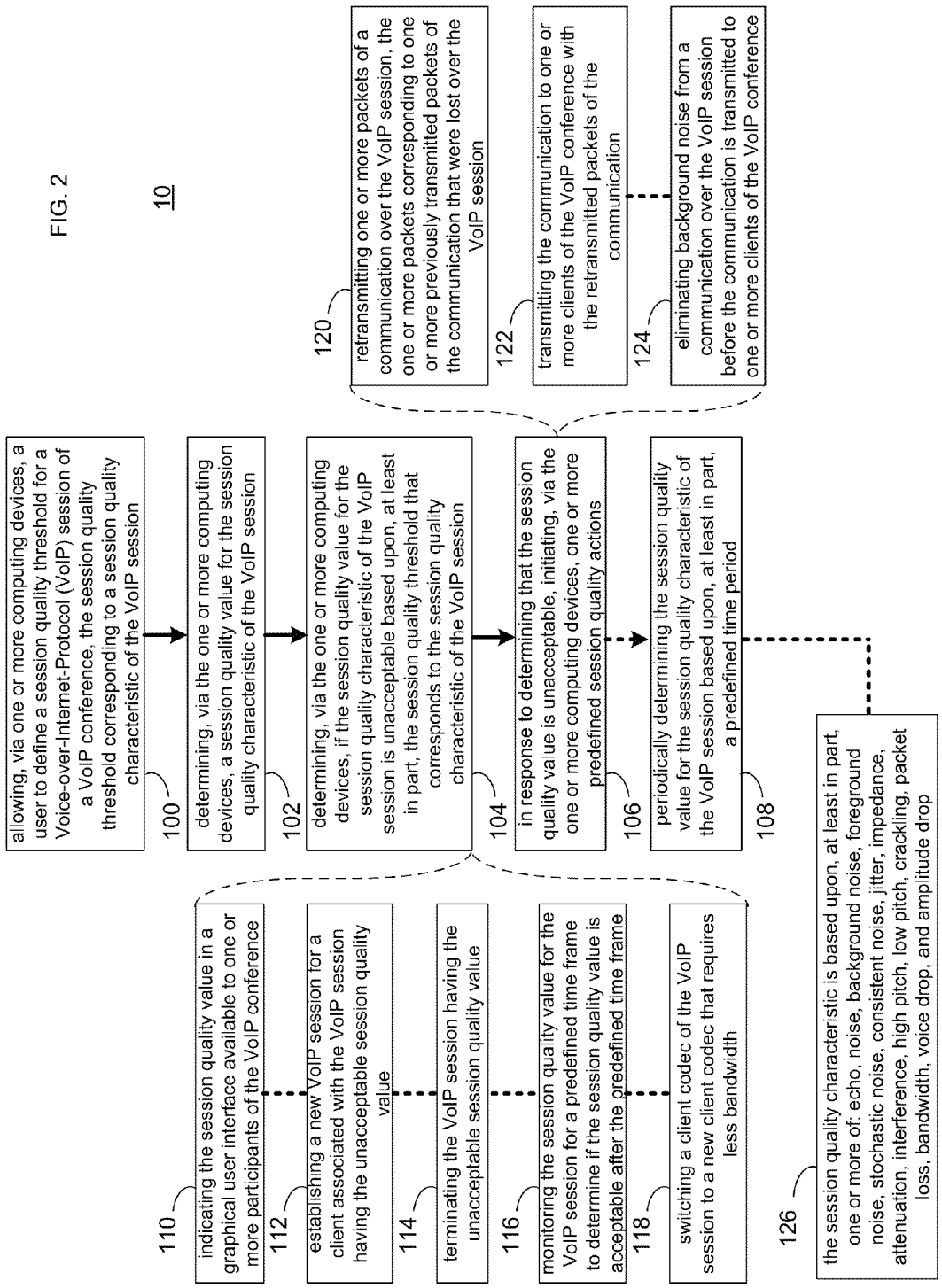
FIG. 2 is a flowchart of the VoIP session quality process of FIG. 1.

Referring to FIGS. 1 & 2, there is shown a VoIP session quality process 10. As will be discussed below, VoIP session quality process 10 may allow 100, a user to define a session quality threshold for a Voice-over-Internet-Protocol (VoIP) session of a VoIP conference, the session quality threshold corresponding to a session quality characteristic of the VoIP session. VoIP session quality process 10 may also determine 102 a session quality value for the session quality characteristic of the VoIP session. VoIP session quality process 10 may further determine 104 if the session quality value for the session quality characteristic of the VoIP session is unacceptable based upon, at least in part, the session quality threshold that corresponds to the session quality characteristic of the VoIP session. Additionally, in response to determining that the session quality value is unacceptable, VoIP session quality process 10 may initiate 106 one or more predefined session quality actions.

The VoIP session quality (VSQ) process may be a server-side process (e.g., server-side VSQ process 10), a client-side process (e.g., client-side VSQ process 12, client-side VSQ process 14, client-side VSQ process 16, or client-side VSQ process 18), or a hybrid server-side/client-side process (e.g., the combination of server-side VSQ process 10 and one or more of client-side VSQ processes 12, 14, 16, 18).

Server-side VSQ process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side VSQ process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side VSQ processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side VSQ processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side VSQ processes 12, 14, 16, 18 and/or server-side VSQ process 10 may be processes that run within (i.e., are part of) a unified communications and collaboration application configured for unified telephony and/or VoIP conferencing (e.g., Lotus® Sametime®). Alternatively, client-side VSQ processes 12, 14, 16, 18 and/or server-side VSQ process 10 may be stand-alone applications that work in conjunction with the unified communications and collaboration application. One or more of client-side VSQ processes 12, 14, 16, 18 and server-side VSQ process 10 may interface with each other (via network 22 and/or network 26). The unified communications and collaboration application may be a unified telephony application and/or a VoIP conferencing application. VSQ process 10 may also run within any e-meeting application, web-conferencing application, or teleconferencing application configured for handling IP telephony and/or VoIP conferencing.

Users 44, 46, 48, 50 may access server-side VSQ process 10 directly through the device on which the client-side VSQ process (e.g., client-side VSQ processes 12, 14, 16, 18) is executed, namely client electronic devices 28, 30, 32, 34, for example. Users 44, 46, 48, 50 may access server-side VSQ process 10 directly through network 22 and/or through secondary network 26. Further, server computer 20 (i.e., the computer that executes server-side VSQ process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The VoIP Session Quality (VSQ) Process

For the following discussion, server-side VSQ process 10 will be described for illustrative purposes. It should be noted that client-side VSQ process 12 may interact with server-side VSQ process 10 and may be executed within one or more applications that allow for communication with client-side VSQ process 12. However, this is not intended to be a limitation of this disclosure, as other configurations are possible (e.g., stand-alone, client-side VSQ processes and/or stand-alone server-side VSQ processes.) For example, some implementations may include one or more of client-side VSQ processes 12, 14, 16, 18 in place of or in addition to server-side VSQ process 10.

Figure 3:
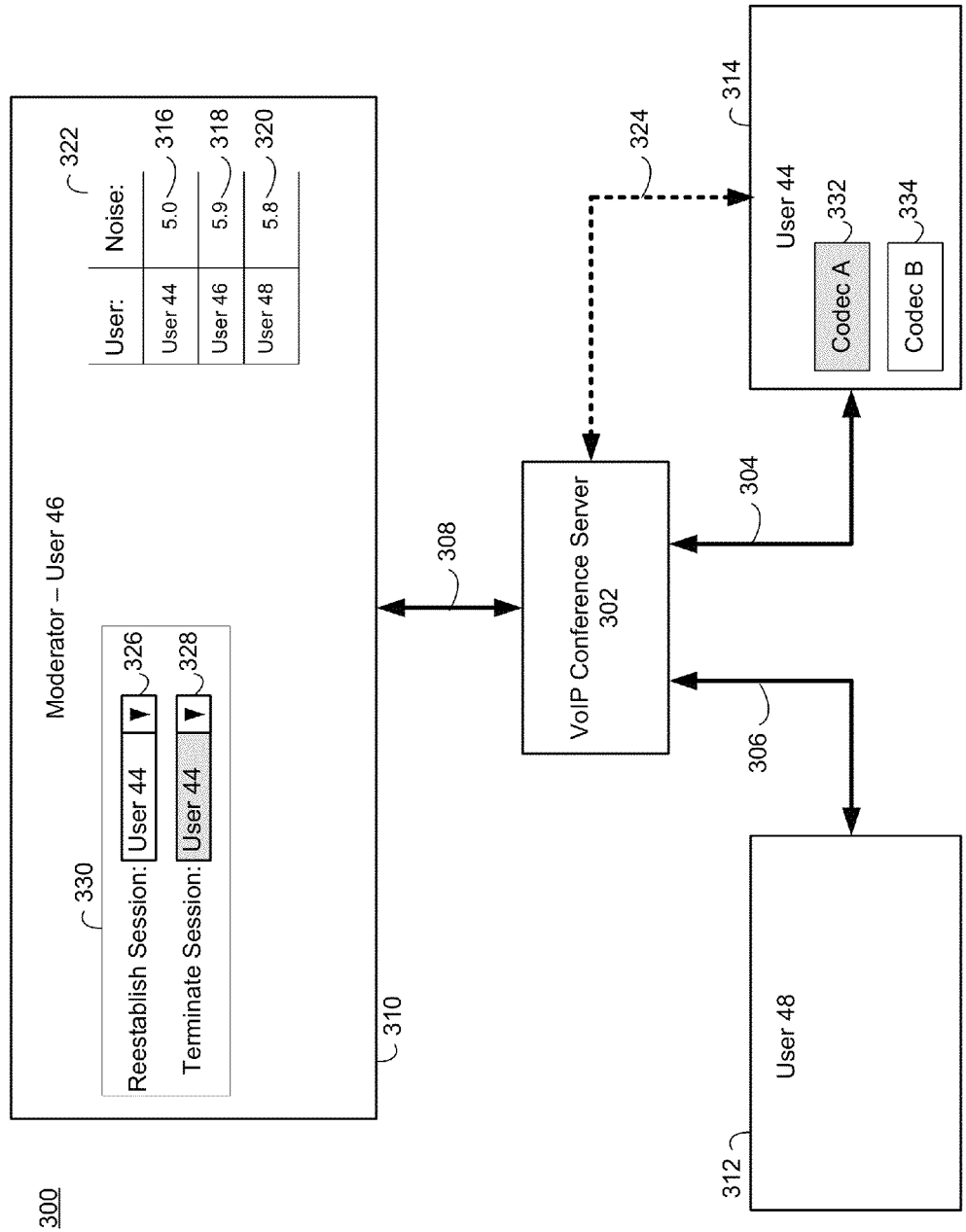
FIG. 3 is a diagrammatic view of an exemplary VoIP conference associated with the VoIP session quality process of FIG. 1.
Figure 4:
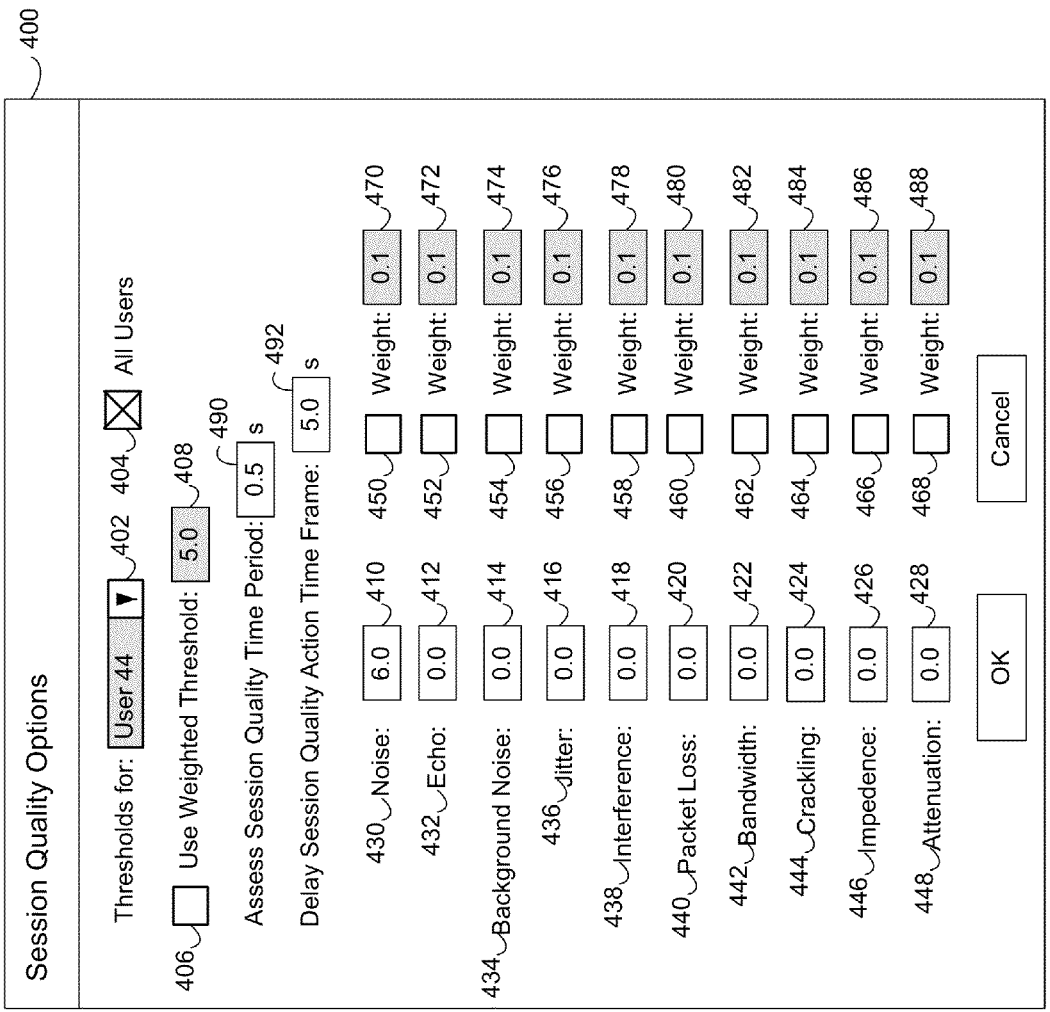
FIG. 4 is an exemplary graphical user interface which may be associated with the VoIP session quality process of FIG. 1.
Figure 5:
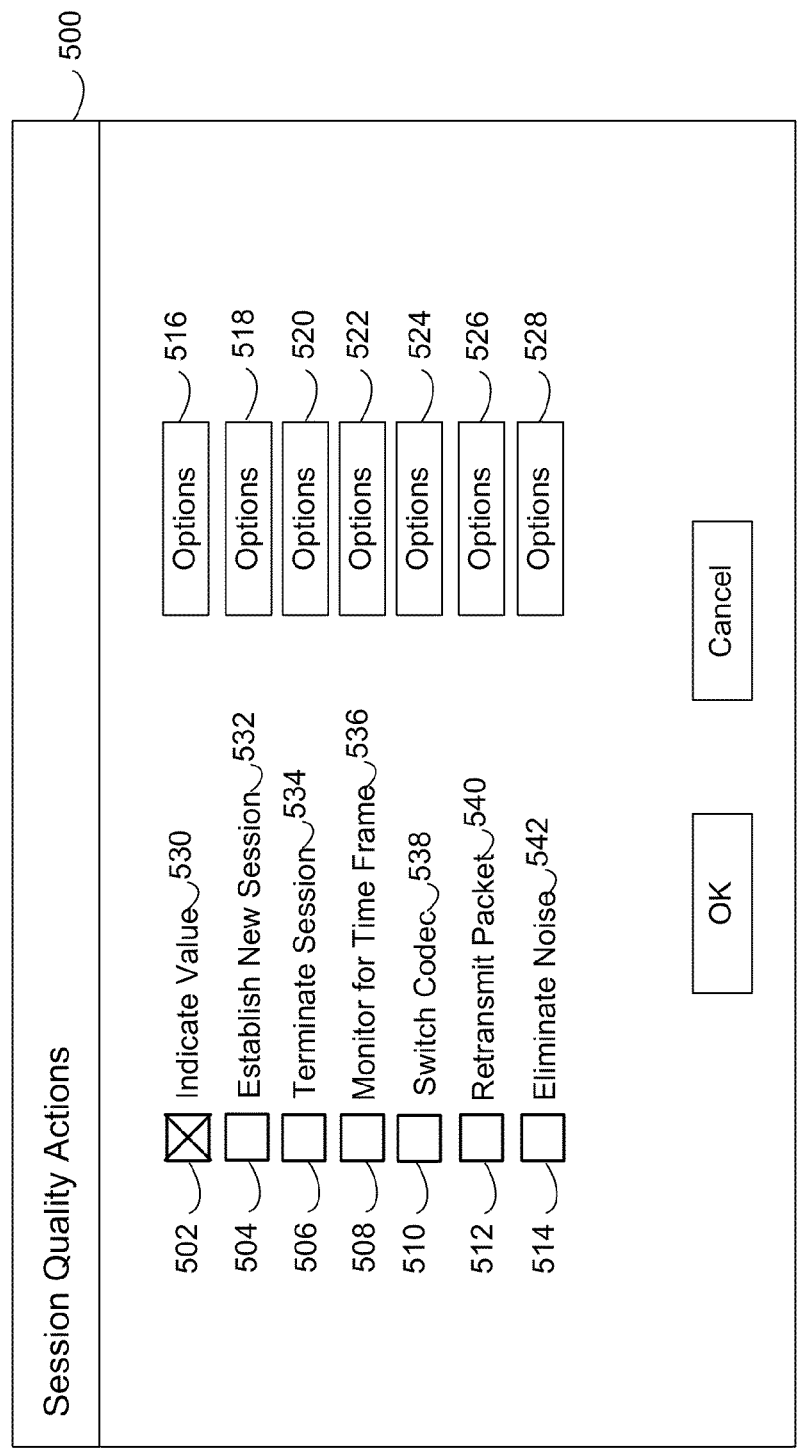
FIG. 5 is also an exemplary graphical user interface which may be associated with the VoIP session quality process of FIG. 1.

Referring now to FIGS. 1-3, one or more of users 44, 46, 48, and 50 may be VoIP conference participants and may be invited to a VoIP conference (e.g., VoIP conference 300). VoIP conference 300 may be conducted via a unified communications and collaboration application which may be configured for unified telephony and/or VoIP conferencing and may be a unified telephony application and/or a VoIP conferencing application (e.g., Lotus® Sametime®). VoIP conference 300 may be a conference, meeting, presentation, or other type of collaborative gathering. Further, VoIP conference 300 may be attended online, and audio associated with VoIP conference 300 may be transmitted to the one or more VoIP conference participants (e.g., one or more of users 44, 46, 48, 50). In an implementation, audio associated with VoIP conference 300 may be streamed to many VoIP conference participants (e.g., one or more of users 44, 46, 48, 50) or may be accessed via a VoIP conferencing application. VoIP conference 300 may have a VoIP conference moderator (e.g., user 46).

A participant of VoIP conference 300 (e.g., one or more of users 44, 46, 48, 50) may establish, via a VoIP conferencing application, a VoIP session (e.g., VoIP session 304, 306, 308) between the VoIP conference server (e.g., server computer 20 and/or VoIP conference server 302) and a corresponding VoIP conference client (e.g., one or more of client electronic devices 28, 30, 32, 34 and/or VoIP conference clients 310, 312, 314). The VoIP session (e.g., VoIP session 304, 306, 308) may be a line through which the participant of VoIP conference 300 (e.g., one or more of users 44, 46, 48, 50) may transmit and receive communications to and from other participants of VoIP conference 300. In other words, if there are 10 participants in VoIP conference 300, each participant may establish, via the VoIP conferencing application and/or their corresponding VoIP conference client, a VoIP session with the VoIP conference server, and there may be 10 VoIP sessions, one for each participant of VoIP conference 300.

For example, user 44 may make a communication to other participants of VoIP conference 300 by speaking into a microphone (not shown) operatively coupled to user 44's VoIP conference client (e.g., VoIP conference client 314). The communication may be received by VoIP conference server 302 via VoIP session 304. VoIP conference server 302 may process and/or perform line quality tests on the communication and/or VoIP session 304. If the communication is acceptable, VoIP conference server 302 may transmit the communication to the rest of the participants (e.g., users 46, 48) of VoIP conference 300 via VoIP sessions (e.g., VoIP sessions 306, 308) established with VoIP conference clients (e.g., VoIP conference clients 310, 312) associated with the other participants (e.g., users 46, 48). The other participants (e.g., users 46, 48) may hear the communication via a speaker (not shown) that may be operatively coupled to their corresponding VoIP conference client (e.g., VoIP conference clients 310, 312).

As discussed above, various noise during VoIP conference 300, including but not limited to, echo and background noise, may be disruptive and/or distracting to the moderator and/or the one or more participants of VoIP conference 300. This noise may originate from one or more of the VoIP conference participants (e.g., one or more of users 44, 46, 48, 50) and may be transmitted to a VoIP conference server (e.g., server computer 20 and/or VoIP conference server 302), which may further transmit the noise to one or more VoIP conference clients (e.g., one or more of client electronic devices 28, 30, 32, 34 and/or VoIP conference clients 310, 312, 314).

As such, this noise may be heard by the one or more of the VoIP conference participants (e.g., one or more of users 44, 46, 48, 50) via their corresponding VoIP conference client (e.g., one or more of client electronic devices 28, 30, 32, 34 and/or VoIP conference clients 310, 312, 314). This noise, as well as other factors effecting VoIP conference 300 including, but not limited to, foreground noise, stochastic noise, consistent noise, jitter, impedance, attenuation, interference, high pitch, low pitch, crackling, packet loss, bandwidth, voice drop, and amplitude drop, may effect the quality of VoIP conference 300. Further, the VoIP conference participants (e.g., one or more of users 44, 46, 48, 50) may not know which VoIP conference participant and/or VoIP session is causing the quality issue.

Referring now to FIGS. 1-5, VSQ process 10 may allow 100 a user (e.g., one or more of users 44, 46, 48, 50) to define a session quality threshold (e.g., one or more of session quality thresholds 410-428) for a VoIP session (e.g., VoIP sessions 304, 306, 308) of a VoIP conference (e.g., VoIP conference 300). The session quality threshold (e.g., one or more of session quality thresholds 410-428) may correspond to a session quality characteristic (e.g., one or more of session quality characteristics 430-448) of the VoIP session (e.g., VoIP sessions 304, 306, 308). One or more of users 44, 46, 48, 50 may define the session quality threshold (e.g., one or more of session quality thresholds 410-428) via graphical user interface (GUI) 400, which may be available from the unified telephony application and/or VoIP conferencing application used for VoIP conference 300. For example, the moderator of VoIP conference 300 (e.g., user 46) may wish to define the session quality threshold for all users participating in VoIP conference 300 and may do so by selecting checkbox 404. In an example, user 46 may wish to define the session quality threshold on a per user basis, and may select a specific user from dropdown menu 402.

The session quality threshold (e.g., one or more of session quality thresholds 410-428) may correspond to a session quality characteristic (e.g., one or more of session quality characteristics 430-448) that may effect the quality of a VoIP session (e.g., VoIP sessions 304, 306, 308). In an implementation, the session quality threshold may be a weighted threshold (e.g., weighted threshold 408) that takes into account one or more of session quality characteristics 430-448. User 46 may select for VSQ process 10 to use weighted threshold 408 by selecting checkbox 406, and may then define weighted threshold 408. Further, user 46 may select one or more of checkboxes 450-468 to select which of the one or more corresponding session quality characteristics 430-448 may be factored into weighted threshold 408. Additionally, user 46 may define one or more session quality threshold weights 470-488 in order to control how much each selected session quality threshold may factor into weighted threshold 408.

VSQ process 10 may further determine 102 a session quality value (e.g., one or more of session quality values 316, 318, 320) for the session quality characteristic (e.g., one or more of session quality characteristics 430-448) of the VoIP session (e.g., VoIP sessions 304, 306, 308). The session quality value may quantify a level of one or more of session quality characteristics 430-448 present in a VoIP session (e.g., VoIP session 304, 306, 308). For example, the session quality value may be calculated on a 0.0-10.0 scale, where 10.0 is the best session quality value and 0.0 is the worst session quality value, for each of the one or more of session quality characteristics 430-448. VSQ process 10 may run one or more tests on VoIP sessions 304, 306, and/or 308 in order to determine session quality values 316, 318, and/or 320. VSQ process 10 may also periodically determine 108 the session quality value (e.g., one or more of session quality values 316, 318, 320) for the session quality characteristic (e.g., one or more of session quality characteristics 430-448) of the VoIP session (e.g., VoIP sessions 304, 306, 308) based upon, at least in part, a predefined time period (e.g., predefined time period 490). In this way user 46 may configure VSQ process 10 to monitor various session quality values in near real-time in order to allow VSQ process 10 to resolve quality issues associated with a VoIP session in near real-time. In other words, a moderator or administrator may adjust predefined time period 490 to be a very small time period (e.g., 0.1 s or 0.01 s) in order to allow VSQ process 10 to resolve quality issues associated with a VoIP session in as close to real-time as possible.

In an implementation, the session quality value may represent a weighted session quality value. The weighted session quality value may represent a plurality of determined session quality values based upon, at least in part, levels of one or more of session quality characteristics 430-448 present in a VoIP session (e.g., VoIP session 304, 306, 308) and measured by VSQ process 10. The weighted session quality value may also be determined based upon, at least in part, one or more options selected via GUI 400. For illustrative purposes only, assume that user 46 selects checkboxes 450 and 452, and enters "0.5" for weight 470 and "0.5" for weight 472. Further, assume that VSQ process 10 determines that a noise value for VoIP session 304 is "5.0" and that an echo value for VoIP session 304 is "7.0". The weighted session quality value for VoIP session 304 may be (5.0×0.5)+(7.0×0.5)=6.0. In this way, the session quality characteristic may be (126) based upon, at least in part, one or more of: echo, noise, background noise, foreground noise, stochastic noise, consistent noise, jitter, impedance, attenuation, interference, high pitch, low pitch, crackling, packet loss, bandwidth, voice drop, and amplitude drop.

VSQ process 10 may further determine 104 if the session quality value (e.g., session quality values 316, 318, and/or 320) for the session quality characteristic (e.g., one or more of session quality characteristics 430-448) of the VoIP session (e.g., VoIP sessions 304, 306, and/or 308) is unacceptable based upon, at least in part, the session quality threshold (one or more of session quality thresholds 410-428) that corresponds to the session quality characteristic (e.g., one or more of session quality characteristics 430-448) of the VoIP session (e.g., VoIP sessions 304, 306, and/or 308). For example, assume that user 46 enters "6.0" as session quality threshold 430 via GUI 400. Further, assume that VSQ process 10 determines 102 that the session quality value for the session quality characteristic (e.g., session quality characteristic 430-"noise") of VoIP session 304 associated with user 46 is "5.0". Since the session quality value for "noise" (e.g., session quality value 316 shown as "5.0") is less than session quality threshold 430, shown as 6.0, VSQ process 10 may determine 104 that session quality value 316 (e.g., "5.0") for session quality characteristic 430 (e.g., noise) of VoIP session 304 is unacceptable.

In response to determining 104 that the session quality value is unacceptable, VSQ process 10 may initiate 106 one or more predefined session quality actions (e.g., session quality actions 530-542). For example, user 46 may define one or more session quality actions (e.g., session quality actions 530-542) via GUI 500, which may be available through the unified telephony application and/or a VoIP conferencing application used for VoIP conference 300. User 46 may select one or more of checkboxes 502-514 to select one or more corresponding session quality actions 530-542 that may be initiated 106 and/or taken by VSQ process 10 in response to determining 104 that the session quality value is unacceptable. Further, user 46 may configure each selected session quality action by selecting one or more of options buttons 516-528 which may be available via GUI 500. In this way, VSQ process 10 may be configured to autonomously diagnose and resolve VoIP conference quality issues. Further, options set via GUI 400 and/or GUI 500 may be adjusted during the VoIP conference in order to control VoIP conference quality on the fly. In other words, while the VoIP conference is in progress, a moderator may adjust one or more session quality thresholds in order to control VoIP conference quality in as close to real-time as possible.

For example, VSQ process 10 may indicate 110 the session quality value (e.g., session quality values 316, 318, 320) in a graphical user interface (e.g., conference list 322) available to one or more participants (e.g., one or more of users 44, 46, 48) of the VoIP conference (e.g., VoIP conference 300). Conference list 322 may be similar to a contact list and/or buddy list and may show a moderator and/or one or more participants of VoIP conference 300 who is present in the conference (e.g., who currently has a live session open, such as sessions 304, 306, 308). While FIG. 3 shows conference list 322 viewable to the moderator (e.g., user 46), this is for exemplary purposes only, and conference list 322 may be viewable to one or more non-moderator participants of VoIP conference 300 as well (e.g., users 44, 48). In an example, upon viewing conference list 322 and session quality value 316 for noise, user 44 may realize that his/her VoIP session (e.g., VoIP session 304) is the primary cause of noise in VoIP conference 300, and user 44 may attempt to resolve the situation. For example, user 44 may mute his/her line, attempt to reestablish VoIP session 304, or simply terminate VoIP session 304.

VSQ process 10 may initiate and/or take a variety of session quality actions in response to determining 104 that the session quality value is unacceptable. For example, VSQ process 10 may establish 112 a new VoIP session (e.g., VoIP session 324) for a client (e.g., VoIP conference client 314) associated with the VoIP session (e.g., VoIP session 304) having the unacceptable session quality value (e.g., session quality value 316). Further, VSQ process 10 may terminate 114 the VoIP session (e.g., VoIP session 304) having the unacceptable session quality value (e.g., session quality value 316). In this way, VSQ process 10 may create a fail-over VoIP session for VoIP conference client 314. In an implementation, if VSQ process 10 determines that new VoIP session 324 is acceptable (e.g., after assessing the quality levels of VoIP session 324 using one or more of the operations described above), VSQ process 10 may terminate 114 the old VoIP session (e.g., VoIP session 304). These session quality actions may be selected and configured via GUI 500. Further, instead of being initiated by VSQ process 10, these session quality actions may be initiated by the moderator (e.g., user 46) by selecting them via dropdown boxes 326 and/or 328, which may be available from GUI 330.

In this way, a moderator of a VoIP conference may configure VSQ process 10 to control VoIP session quality on a per user basis. For example, if user 48 is the CEO of a company and user 46 is subordinate to user 48, user 46 may wish to configure session quality thresholds (e.g., via GUI 400) liberally for user 48 in order to prevent user 48's VoIP session from being easily terminated.

Further, in response to determining 104 that the session quality value is unacceptable, VSQ process 10 may monitor 116 the session quality value (e.g., session quality value 316) for the VoIP session (e.g., VoIP session 304) for a predefined time frame (e.g., time frame 492) to determine if the session quality value (e.g., session quality value 316) is acceptable after the predefined time frame (e.g., time frame 492). Time frame 492 may be defined via GUI 400 and selected and configured via GUI 500. Assume for illustrative purposes that while present in VoIP conference 300 via VoIP session 304, user 44 is also downloading a large file. This download may consume bandwidth available to user 44's system (e.g., VoIP conference client 314) for a small amount of time (e.g., 5 seconds). In other words, due to various fluctuations in available bandwidth, there may be latency between VoIP conference client 314 and VoIP conference server 302. During this time, VSQ process 10 may determine that the left over bandwidth is not enough to support an acceptable session quality for VoIP conference client 314 in VoIP conference 300. However, after monitoring 116 the session quality value for bandwidth associated with VoIP session 304 for time frame 492 (e.g., 5 seconds), VSQ process 10 may determine that the session quality value for bandwidth associated with VoIP session 304 has returned to an acceptable level because the download may have completed and more bandwidth may have opened up.

Continuing with the above example, assume for illustrative purposes that user 44 is downloading a number of extremely large files, and that VSQ process 10 has determined that the left over bandwidth is not enough to support an acceptable session quality for VoIP conference client 314 in VoIP conference 300. VSQ process 10 may switch 118 a client codec (e.g., codec 332) of the VoIP session to a new client codec (e.g., codec 334) that may require less bandwidth. A codec may be a device and/or program configured to encode/decode a digital data stream or signal. The new client codec (e.g., codec 334) may require less bandwidth but may still provide an acceptable session quality.

In an example, VSQ process 10 may determine 104 that the session quality value that is unacceptable corresponds to packet loss. Packet loss may occur if one or more packets of data (e.g., representing a communication) transmitted from VoIP conference client 314 fail to reach VoIP conference server 302. This may render the communication incomplete and may contribute to a low session quality value for packet loss for VoIP session 304. VoIP conference client 314 may know which packets were sent, and VoIP conference server 302 may know which packets were received, over VoIP session 304. In order to maintain knowledge of packet loss, VSQ process 10 may use cyclic redundancy checks (CRC's). With this knowledge, VSQ process 10 may determine which packets were lost, and may plug the lost packets back into the communication before it is transmitted from VoIP conference server 302 to VoIP conference clients 310 and 312. Based upon, at least in part, predefined session quality actions, VSQ process 10 may retransmit 120 one or more packets of a communication over the VoIP session (e.g., VoIP session 304). The one or more packets may correspond to one or more previously transmitted packets of the communication that were lost over the VoIP session (e.g., VoIP session 304). Further, VSQ process 10 may transmit 122 the communication to one or more clients (e.g., VoIP conference clients 310, 312) of the VoIP conference (e.g., VoIP conference 300) with the retransmitted packets of the communication.

Further, VSQ process 10 may determine 104 that the session quality value that is unacceptable corresponds to background noise. VSQ process 10 may eliminate 124 background noise from a communication over the VoIP session (e.g., VoIP session 304) before the communication is transmitted to one or more clients (e.g., VoIP conference clients 310, 312) of the VoIP conference (e.g., VoIP conference 300). In an implementation, VSQ process 10 may use a codec running on VoIP conference server 302 to eliminate 124 background noise from the communication. The codec may be configured to eliminate background noise before transmitting the communication to VoIP conference clients 310, 312.

In an implementation, VSQ process 10 may use a tool such as IBM ViaVoice™ to store and retrieve one or more samplings of users' voices. VSQ process 10 may further use these samplings to fill in gaps when VoIP session quality degrades or if there is noise over the VoIP session. For example, if a mobile phone user is in a VoIP conference and a car horn causes background noise, VSQ process 10 may detect the background noise and may remove that background noise when transmitting the communication to the other VoIP conference clients. Further, VSQ process 10 may replace speech covered by the background noise with speech generated from the one or more samples for that user. In other words, VSQ process 10 may analyze the original speech covered by the background noise, remove the background noise, and replace it with generated speech matched from the one or more samples for that user.

Also, in an implementation, one or more users in the VoIP conference may be using a very high quality audio setting for the VoIP session. This may trigger unacceptable quality levels for the VoIP session due to the high quality of audio demanded. In this situation, VSQ process 10 may force the user with the high quality audio setting to user a lower quality audio setting.

It should be noted that VSQ process 10 may be an autonomic process and may be self-managing in terms of controlling VoIP conference quality. In other words, based upon various predefined preferences and configurations such as those discussed above, VSQ process 10 may adapt to unpredictable changes without requiring further input from users. VSQ process 10 may use high level policies and preferences to constantly check and optimize it's status. In other words, VSQ process 10 may be self-regulating and may automatically adapt to changing conditions. In an example, user 44's voice may drop over VoIP session 304 because of amplitude and/or frequency changes. VSQ process 10 may autonomically adjust the amplitude and/or frequency of the stream based upon, at least in part, one or more policies and/or preferences.

Further, it should be noted that the one or more session quality characteristics shown in GUI 400 and the one or more session quality actions shown in GUI 500 are shown for exemplary purposes only. Other session quality characteristics that may not be shown in GUI 400 may be measured by VSQ process 10 and other session quality actions that may not be shown in GUI 500 may be used by VSQ process 10 to control VoIP conference quality. For example, in response to determining an unacceptable VoIP session quality, VSQ process 10 may simply mute communications originating from the VoIP conference client associated with that VoIP session. Additionally, the preferences set via GUI 400 and/or GUI 500, for example, may be stored and may be used in subsequent VoIP conferences based upon, at least in part, the users that will be present in the subsequent VoIP conferences.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A computer program product residing on a computer readable storage medium having a plurality of instructions stored thereon, which, when executed by a processor, cause the processor to perform operations comprising:
    allowing a user to select one or more session quality characteristics of a Voice-over-Internet-Protocol (VoIP) session of a VoIP conference;
    allowing the user to define a session quality threshold weight associated with each of the one or more session quality characteristics;
    allowing a user to define a session quality threshold for the VoIP session of the VoIP conference, the session quality threshold corresponding to the one or more session quality characteristics of the VoIP session;
    determining a session quality value for the session quality characteristic of the VoIP session, wherein the session quality value is determined as close to real-time as possible, wherein the session quality value includes a weighted session quality value determined based upon, at least in part, the session quality threshold weight associated with each of the one or more session quality characteristics of the VoIP session;
    determining if the session quality value for the session quality characteristic of the VoIP session is unacceptable based upon, at least in part, the session quality threshold that corresponds to the session quality characteristic of the VoIP session; and
    in response to determining that the session quality value is unacceptable, initiating one or more predefined session quality actions.

2. The computer program product of claim 1, further comprising:
    periodically determining the session quality value for the session quality characteristic of the VoIP session based upon, at least in part, a predefined time period.

3. The computer program product of claim 1, wherein the one or more predefined session quality actions include:
    indicating the session quality value in a graphical user interface available to one or more participants of the VoIP conference.

4. The computer program product of claim 1, wherein the one or more predefined session quality actions include at least one of:
    establishing a new VoIP session for a client associated with the VoIP session having the unacceptable session quality value; and
    terminating the VoIP session having the unacceptable session quality value.

5. The computer program product of claim 1, wherein the one or more predefined session quality actions include:
    monitoring the session quality value for the VoIP session for a predefined time frame to determine if the session quality value is acceptable after the predefined time frame.

6. The computer program product of claim 1, wherein the one or more predefined session quality actions include:
    switching a client codec of the VoIP session to a new client codec that requires less bandwidth.

7. The computer program product of claim 1, wherein the one or more predefined session quality actions include:
    retransmitting one or more packets of a communication over the VoIP session, the one or more packets corresponding to one or more previously transmitted packets of the communication that were lost over the VoIP session; and transmitting the communication to one or more clients of the VoIP conference with the retransmitted packets of the communication.

8. The computer program product of claim 1, wherein the one or more predefined session quality actions include:

eliminating background noise from a communication over the VoIP session before the communication is transmitted to one or more clients of the VoIP conference.

9. The computer program product of claim 1, wherein the session quality characteristic is based upon, at least in part, one or more of: echo, noise, background noise, foreground noise, stochastic noise, consistent noise, jitter, impedance, attenuation, interference, high pitch, low pitch, crackling, packet loss, bandwidth, voice drop, and amplitude drop.

10. A computing system comprising:

at least one processor;

at least one memory architecture coupled with the at least one processor;

a first software module executable by the at least one processor and the at least one memory architecture, wherein the first software module is configured to allow a user to select one or more session quality characteristics of a Voice-over-Internet-Protocol (VoIP) session of a VoIP conference;

a second software module executable by the at least one processor and the at least one memory architecture, wherein the second software module is configured to allow the user to define a session quality threshold weight associated with each of the one or more session quality characteristics;

a third software module executable by the at least one processor and the at least one memory architecture, wherein the third software module is configured to allow a user to define a session quality threshold for the VoIP session of the VoIP conference, the session quality threshold corresponding to the one or more session quality characteristics of the VoIP session;

a fourth software module executable by the at least one processor and the at least one memory architecture, wherein the fourth software module is configured to determine a session quality value for the session quality characteristic of the VoIP session, wherein the session quality value is determined as close to real-time as possible, wherein the session quality value includes a weighted session quality value determined based upon, at least in part, the session quality threshold weight associated with each of the one or more session quality characteristics of the VoIP session; and a fifth software module executable by the at least one processor and the at least one memory architecture, wherein the fifth software module is configured to determine if the session quality value for the session quality characteristic of the VoIP session is unacceptable based upon, at least in part, the session quality threshold that corresponds to the session quality characteristic of the VoIP session; and a sixth software module executable by the at least one processor and the at least one memory architecture, wherein the sixth software module is configured to, in response to determining that the session quality value is unacceptable, initiate one or more predefined session quality actions.

11. The computing system of claim 10, further comprising:

a seventh software module executable by the at least one processor and the at least one memory architecture, wherein the seventh software module is configured to periodically determine the session quality value for the session quality characteristic of the VoIP session based upon, at least in part, a predefined time period.

12. The computing system of claim 10, wherein the one or more predefined session quality actions include:

indicating the session quality value in a graphical user interface available to one or more participants of the VoIP conference.

13. The computing system of claim 10, wherein the one or more predefined session quality actions include at least one of:

establishing a new VoIP session for a client associated with the VoIP session having the unacceptable session quality value; and terminating the VoIP session having the unacceptable session quality value.

14. The computing system of claim 10, wherein the one or more predefined session quality actions include:

monitoring the session quality value for the VoIP session for a predefined time frame to determine if the session quality value is acceptable after the predefined time frame.

15. The computing system of claim 10, wherein the one or more predefined session quality actions include:

switching a client codec of the VoIP session to a new client codec that requires less bandwidth.

16. The computing system of claim 10 wherein the one or more predefined session quality actions include:

retransmitting one or more packets of a communication over the VoIP session, the one or more packets corresponding to one or more previously transmitted packets of the communication that were lost over the VoIP session; and transmitting the communication to one or more clients of the VoIP conference with the retransmitted packets of the communication.

* * * * *